Dec. 18, 1962 A. FERRI 3,069,119
SERRATED COWLING RINGS ON BODIES OF REVOLUTION
Filed June 29, 1960
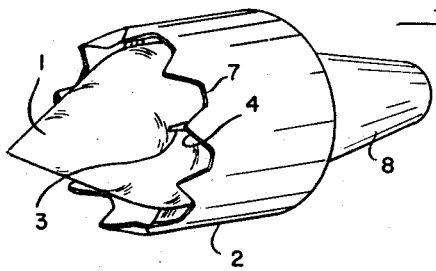
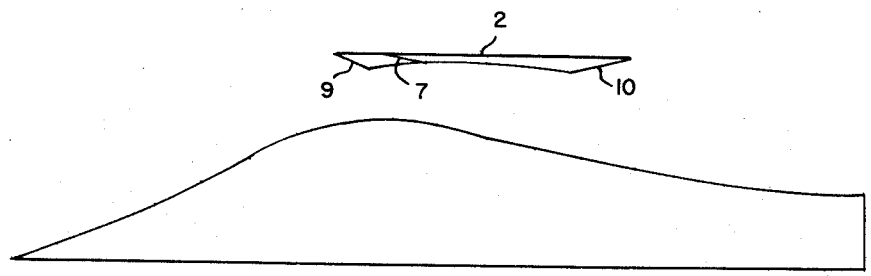
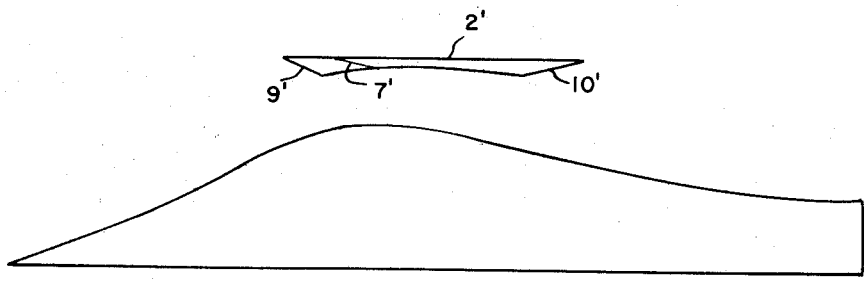
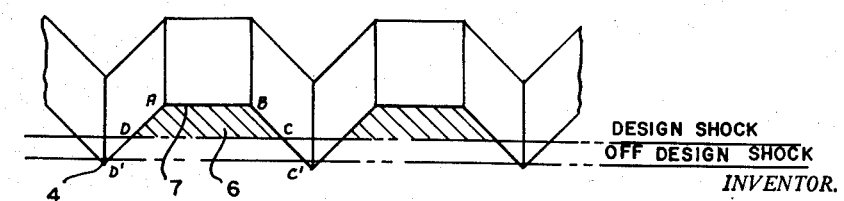
INVENTOR.
ANTONIO FERRI
BY
ATTORNEYS 3,069,119
SERRATED COWLING RINGS ON BODIES
OF REVOLUTION
Antonio Ferri, Rockville Centre, N.Y., assignor to the United States of America as represented by the Secretary of the Air Force
Filed June 29, 1960, Ser. No. 39,746
5 Claims. (Cl. 244—130)

This invention relates to a fairing wherein a cowling ring is secured on a body of revolution, and more particularly, to serrations on the cowling ring which provide for variable spillage of air mass at forward velocities at design and below design Mach numbers. The word serration is defined by the dictionary as a forwardly pointing toothed edge or margin, like a saw edge.

Prior art cowlings mounted on a body of revolution are effective at design Mach numbers in capturing pressure waves radiated from the nose of the body of revolution and conserving the kinetic energy of the pressure waves. A necessary condition at the throat between the cowling and the body of revolution is that the flow of air through the throat must be at velocity above Mach 1. At below design Mach numbers the air mass eventually falls below Mach 1 at the throat of the system causing great turbulence and a pop out of the air mass in a forward direction. When this happens, the system has to be restarted by increasing the system velocity substantially to the design Mach number such that the air mass velocity at the throat reaches Mach 1 or above. The design of the system for a particular Mach number controls the area between the cowling and the body of revolution, and since air mass velocity at the throat area is proportionally lower as the system velocity decreases, the quantity of air mass moving through the throat must be reduced in order to maintain air velocities at Mach 1 or above.

Reduced quantity of air mass flow and accordingly sustained supersonic air velocity at the throat is achieved by varying the air spillage at the forward edge of the cowling. This is accomplished by the truncated V-shaped serrations formed in the forward edge of the cowling which allow increasing quantities of air to escape into space as the velocity of the system decreases since the Mach angle increases accordingly permitting escape of proportionately larger amounts of air.

An object of this invention is to conserve the energy in the shock waves radiating from the forward edge of the body of revolution.

A further object of this invention is to regulate and maintain pressure distribution on the body of revolution to minimize pressure drag.

A further object of this invention is to maintain supersonic pressure wave velocity at the throat between the cowling and the body of revolution at design Mach numbers and below.

A further object of this invention is to decrease the quantity of air flowing between the cowling and the body of revolution as the system velocity falls below design Mach number such that the condition of supersonic flow at the throat is satisfied.

A still further object of this invention is to conserve the energy in the air mass flowing between the cowling and the body of revolution and to utilize it to produce a resultant forward thrust.

These and other objects and advantages of the invention will be apparent from the following description when taken with the accompanying drawings in which:

FIG. 1 is a perspective view of the fairing employing the principles of this invention comprising a serrated cowling mounted on a body of revolution.

FIG. 2 is a diagrammatic longitudinal half cross-sectional view of the invention shown in FIG. 1.

FIG. 3 is a cross-sectional view of a modified form of the invention similar to the embodiment illustrated in FIG. 2.

FIG. 4 is a schematic view of the serrated cowling showing the effective spillage area for design shock waves and off design shock waves.

From FIG. 1 of the drawing the entire system of the invention may be seen including the center body of revolution 1 and the cowling member 2 surrounding the center body of revolution. The cowling member 2 is attached to the center body of revolution as by three radial ribs 3 uniformly spaced about the center body of revolution and running longitudinally the length of the cowling. To give maximum structural support, the ribs are placed in alignment with the apex 4 of the serrated forward edge portion of the cowling. To minimize drag due to friction, the number of ribs is kept to a minimum but sufficient to give necessary structural support for the cowling.

In FIGS. 2 and 3 the specific relationships between the cowling and the body of revolution can be seen. The body of revolution is pointed at its forward edge and moving rearwardly merges into a slightly concave portion which in turn merges into a convex portion of maximum cross section. Rearwardly of the convex portion the body merges into a slightly concave portion and terminates at the rearward end in a reduced in diameter squared off tail portion 8.

In referring to the embodiments of FIGS. 2 and 3, like numerals will be used to identify like parts with the numbers primed in FIG. 3. The embodiment of FIG. 2 is similar to the embodiment of FIG. 3 excepting that the cowling 2 in FIG. 3 is moved forward along the longitudinal axis of the center body of revolution. The cowling members of each of the embodiments are identical in configuration as is the center body of revolution. Moving the cowling forward or rearwardly along the body of revolution affects the location of the throat as can be seen by comparing the two figures.

The inner surface of the forward and rearward peripheral edges 9 and 10, respectively of the cowling members of each of the embodiments is tapered toward a median portion giving the pattern in FIG. 2 a sharp half spear peripheral edge. In each of the embodiments, the inner surface of the median portion of the cowling is concave in configuration.

The schematic drawing of FIG. 4 illustrates the serrated forward edge of the cowling member. As can be seen, the serrations 6 are truncates V-shaped in design providing a base edge 7. The number of apexes 4 formed along the forward edge of the cowling may vary. However, a preferred number, as illustrated in FIG. 1, is nine.

The objectives and principles of the present invention may be practiced as long as the relative spacial relationship and preparation between the center body of revolution and the cowling is maintained even though the overall dimensions of the elements of the system are changed. The preferred embodiments disclosed in FIGS. 2 and 3 are nine inches in length. The cowling member from the apex of one of the serrations to the rearward edge is approximately four and one-half inches in length. The base portion of the center body of revolution is approximately one and five-eighths inches in diameter. The maximum cross-sectional diameter of the center body of revolution is three inches.

The center body of revolution of this invention while travelling at speeds exceeding Mach 1 imparts large quantities of kinetic energy to the pressure waves that radiate from the pointed forward edge of the body. If these waves are not made use of they will be radiated into space with a loss of their kinetic energy. The cowling 2 serves to capture these pressure waves and to channel their kinetic energy into the system such that they will contribute to the forward thrust of the system by maintaining a desired pressure distribution along the surface of the body of revolution. The design of the cowling with respect to its location to the center body of revolution is dictated by the range of speed anticipated for the system. For slower speeds above Mach 1 the cowling may be moved rearwardly along the longitudinal axis of the center body of revolution, as in FIG. 2, since the Mach angle of the pressure waves is smaller as the speed of the system increases. Conversely, as the speed of the system increases, the preferred location of the cowling with respect to the center body of revolution is in a forward position, as in FIG. 3. The design of the system cannot satisfy all conditions required or dictated by all speeds, therefore, a median range of speed is used to dictate the design of the system.

The present system was designed for speeds at Mach 3.04 and below, however, systems designed for other ranges of speed may be designed and still practice the salient principles of this invention.

The pressure waves captured by the cowling reflect off the forward edge of the cowling into the median portion of the center body of revolution and back to the cowling member. This interrelationship of pressure waves affects the cancellation of some of the waves and results in a rearward movement of the mass of air flowing between the cowling and center body of revolution. This mass of air moves at high pressures which are distributed along the length and behind the body of revolution. Without the pressure being maintained at the rearward portion of the center body of revolution, a low pressure would exist resulting in a pressure drag along the rearward portion of the center body of revolution and the base portion. This would, of course, reduce the overall velocity of the system.

In addition to eliminating pressure drag along the rearward end portion of the center body of revolution and behind the base of the center body of revolution, the positive pressure along this rearward portion and behind contributes to forward thrust. All the pressures along the reduced diameter end portion of the center body of revolution and against the base portion have a component in the forward direction resulting in a forward force.

The nonserrated body configuration contributes or illustrates the effective use of interference as a means of drag reduction for nonlinear systems. However, this system is only practical at design Mach number. To improve the off-design qualities, the use of a serrated circular cowling is necessary.

For the system to operate as intended, the flow of air through the annulus must be at a velocity in excess of Mach 1. A velocity below Mach 1 at the throat of the system will result in a pop out causing great turbulence in front of the system and resulting in a drag. Of course, the purpose of the cowling will thus be defeated. As the velocity of the system is reduced below the designed Mach number the velocity of the air mass at the throat will, accordingly, be reduced. At some point the velocity of the nonserrated system will fall below Mach 1 resulting in the pop out of air mass at the entrance to the annulus. The serrations of this invention are designed to prevent the pop out that would ordinarily result. This occurs because the Mach angle increases as the velocity of the system decreases. Since the angle of the pressure waves increases, more of the pressure waves will escape through the serrations in the forward edge of the cowling. As the velocity of the system decreases more air is spilled out and the velocity at the throat can be maintained at a velocity greater than Mach 1.

Referring to FIG. 4, it will be seen that additional spillage area can be achieved by the serrated cowling, because the shock intersection position moves forward as the speed of the system decreases, thereby increasing the spillage region (A, B, C, D) to (A, B, C', D').

The cowling it is seen does contribute to a reduction in the pressure drag and to a degree to the forward thrust of the system. However, other forms of drag have a bearing on the total effectiveness of the cowling in reducing the total drag, and therefore their effect must be taken into consideration. Comparisons of the total drag of the body of revolution with and without a cowling show that pressure drag and base drag are substantially smaller in the case of the cowling model while the skin friction drag was higher giving a total reduction in drag of 47%. The drag for the specific embodiments shown in FIGS. 2 and 3 was compared with the drag associated with the center body of revolution. These comparisons show that the total drag reduction for the embodiment of FIG. 2 was 64% while the total reduction in drag for the embodiment of FIG. 3 was 56.9%.

While there have been herein diagrammatically illustrated and particularly described certain embodiments of the invention adapted for attaining the objects thereof it will be understood that I do not desire or intend to thereby be limited or confined in any way as changes and modifications in the form, structure, arrangement and relationship of the several parts to each other will readily occur to those skilled in the art and may be made, if desired, without departing from the spirit and scope of the invention as defined in the appended claims.

I claim:
1. A fairing adapted to travel at design supersonic speed and below, said fairing comprising a center body of revolution having a sharply pointed forward end and an external cowling member coaxial and uniformly spaced radially about said center body of revolution, said cowling secured to said center body of revolution by a plurality of longitudinal radially extending ribs uniformly positioned around the external surface of said center body of revolution, said cowling having a forward peripheral edge uniformly serrated to provide increased variable spillage of pressure waves at below design velocities.

2. A fairing as recited in claim 1 wherein said sharply pointed forward end of said center body of revolution is slightly concave in contour and merges smoothly into a convex median portion of maximum cross section into a slightly concave rearward portion of reduced diameter.

3. A fairing as recited in claim 2 wherein the inner surface of said cowling is concave longitudinally thereof with a sharp edged forward and rearward end.

4. A fairing as recited in claim 1 wherein said serrated peripheral edge of said cowling includes a plurality of uniformly spaced truncated serrations.

5. A fairing as recited in claim 4 wherein said truncated serrations provide a series of tooth-like projections around the peripheral edge of said cowling and said projections having an inner edge surface rearwardly and inwardly tapered.

References Cited in the file of this patent

UNITED STATES PATENTS

| 2,649,266 | Darrieus | Aug. 18, 1953 |
| 2,907,536 | Zborowski | Oct. 6, 1959 |
| 2,959,916 | Carlton et al. | Nov. 15, 1960 |
| 3,008,291 | Hardgrave | Nov. 14, 1961 |

FOREIGN PATENTS

| 220,760 | Australia | Mar. 19, 1959 |